United States Patent [19]

Cunningham

[11] Patent Number: 4,930,246
[45] Date of Patent: Jun. 5, 1990

[54] DOUBLE HOOK FISH LURE WITH ADJUSTABLE TRAILER HOOK

[75] Inventor: Roy D. Cunningham, Columbus, Miss.

[73] Assignee: Southern Lure Company, Columbus, Miss.

[21] Appl. No.: 372,093

[22] Filed: Jun. 28, 1989

[51] Int. Cl.⁵ .............................................. A01K 85/00
[52] U.S. Cl. ...................................... 43/42.28; 43/44.8
[58] Field of Search .................... 43/42.28, 42.5, 44.8, 43/44.82, 42.1

[56] References Cited

U.S. PATENT DOCUMENTS

| | | | |
|---|---|---|---|
| 3,803,747 | 4/1974 | Cartwright | 43/42.28 |
| 3,914,895 | 10/1975 | Mize | 43/42.28 |
| 4,470,217 | 9/1984 | Adams | 43/44.8 |
| 4,750,291 | 6/1988 | Chilton | 43/44.82 |

Primary Examiner—M. Jordan
Attorney, Agent, or Firm—Mason, Fenwick & Lawrence

[57] ABSTRACT

An adjustable trailer hook assembly for use with a double hook fish lure includes a trailer hook portion, a trailer hook shank extending from the hook portion and having an eye at its end remote from the hook portion and a 90° bend near the eye. In use, the trailer hook eye loosely surrounds the double hook lure shank for sliding movement along the hook lure shank to move the trailer hook into and out of parallel juxtaposition with the double hook lure. In a preferred embodiment, a flexible skirt fits snugly around the double hook shank and is moveable thereon to force the trailer hook eye against the diverging hooks of the double hook lure to hold the trailer hook in a semi-rigid state in parallel juxtaposition with the double hook lure.

13 Claims, 1 Drawing Sheet

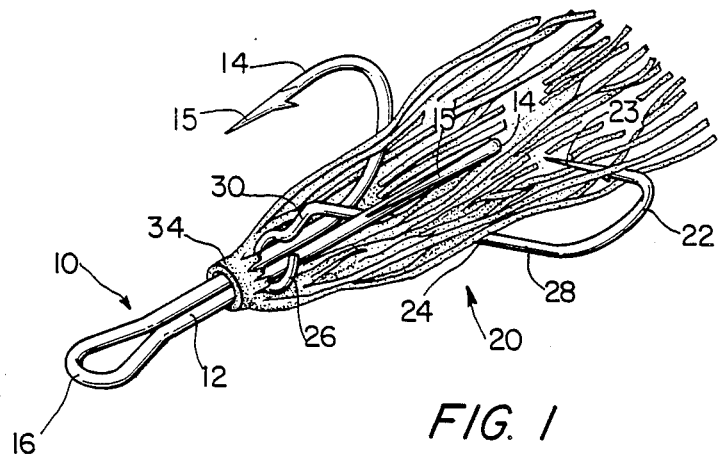
FIG. 1
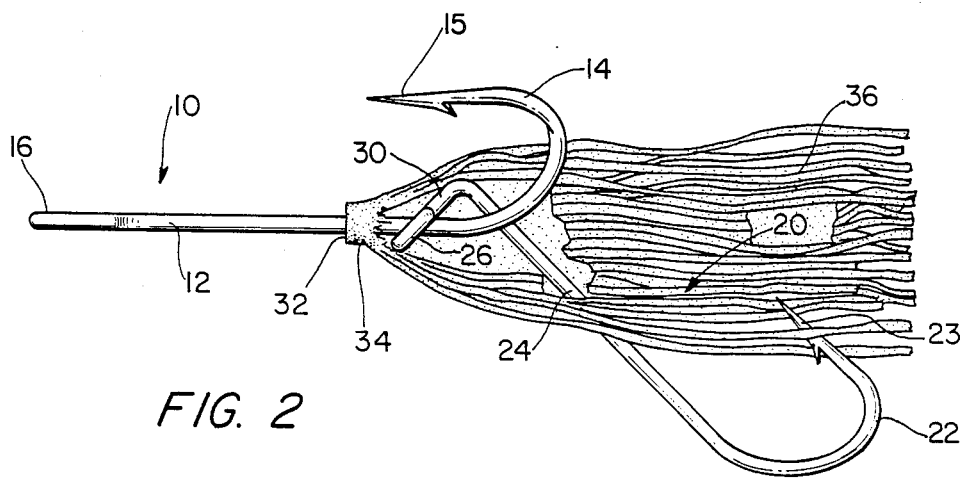
FIG. 2
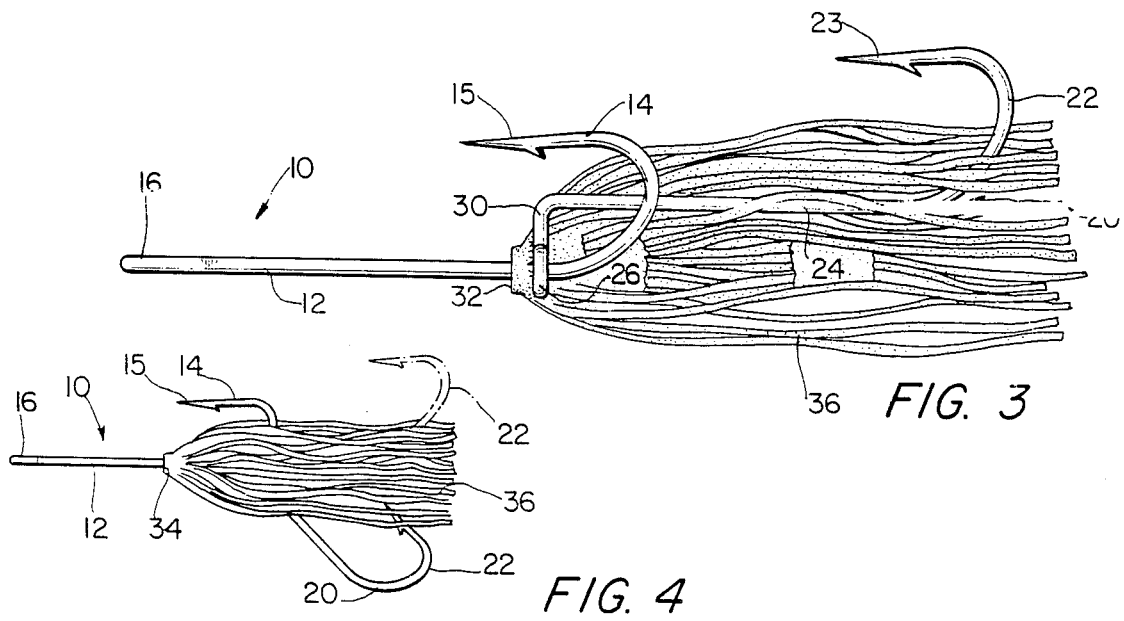
FIG. 3
FIG. 4

DOUBLE HOOK FISH LURE WITH ADJUSTABLE TRAILER HOOK

BACKGROUND OF THE INVENTION

The present invention is directed to the field of fish lures. More specifically, the invention relates to a fish lure employing a single trailer hook for use in combination with a double hook fish lure with the construction being such that the position and orientation of the trailer hook can be adjusted to accommodate various conditions of use of the lure.

Conventional trailer hooks are known for use with single hook fish lures. Such a trailer hook typically has an eye at the end of the shank remote from the barbed end through which the barbed end of the single hook lure is passed. Such trailer hooks work well in areas of low vegetation. However, they are not adjustable into and out of parallel juxtaposition with the single hook lure but essentially remain in a trailing orientation relative to and in alignment with the single hook during use. As a result, such trailer hooks often get caught on weeds of the like when the lure is reeled in in high vegetation areas.

SUMMARY OF THE INVENTION

Therefore, it is a primary object of this invention to provide a lure having movable trailer hook for use with a double hook fish lure which is adjustable between an essentially fixed orientation in parallel juxtaposition with the double hook lure, for use in low vegetation areas, and a weedless orientation out of parallel juxtaposition with the double hook lure in which the barb of the trailer hook is somewhat more shielded by the double hook and can also be provided with a plastic worm or grub for use in high vegetation areas.

The object of the invention is achieved by providing a trailer hook with a shank having a 90° bend near the end of the shank remote from the barb portion and an open trailer hook eye at the remote end of the shank. The open eye can be closed loosely around the double hook shank of a double hook fish lure with a pair of pliers or the like for permitting the trailer hook to have sliding movement along the double hook shank.

The trailer hook is adjusted into and out of parallel juxtaposition with the hooks of the double hook lure by movement of the trailer hook eye toward and away from the diverging portions of the double hook lure, respectively.

A flexible skirt formed of rubber or similar material fits snugly around the double hook shank to force the trailer hook eye against the diverging barbed portions of the double hook of the lure to hold the trailer hook in a semi-rigid state in an extended position in parallel juxtaposition with the double hook lure for use in water that is relatively clear of vegetation or other material on which the trailing hook would be likely to snag. For use in water having a large amount of vegetation the skirt can be moved away from the diverging barbed portions and the trailer hook moves to a retracted position out of parallel juxtaposition with the double hook lure in which it is less likely to snag on the vegetation.

DESCRIPTION OF THE DRAWINGS

A better understanding of the subject invention will be achieved when the following written description is considered in conjunction with the appended drawings in which:

FIG. 1 is a perspective view of the preferred embodiment lure illustrating the adjustable trailer hook attached to the double hook lure in its retracted position in orientation out of parallel juxtaposition with the double hook lure;

FIG. 2 is a side elevation view of the trailer hook attached to the double hook lure with the trailer hook in the same position as in FIG. 1;

FIG. 3 is a side elevation view of the trailer hook attached to the double hook lure in its extended position in parallel juxtaposition with the double hook lure; and FIG. 4 is a side elevation view illustrating the extreme positions that can be assumed by the trailer hook.

DESCRIPTION OF THE PREFERRED EMBODIMENTS

In describing the preferred embodiments of the subject invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIG. 1 illustrates a conventional double hook fish lure 10 having a double hook shank 12, two diverging barbed hook portions 14 extending from one end of double hook shank 12, and having sharp barbs 15 defining their outer extent with a closed double hook eye 16 extending from the other or forward end of the lure 10. The "rear" of the lure is the right side thereof as illustrated 12 in FIG. 2. For purposes of explanation, the direction "upper" as used herein is applied to the lure as shown in FIGS. 2 and 3 and means the direction toward the upper end of the drawing with "lower" meaning the direction toward the bottom of the drawing. Barbed hook portions 12 are symmetrically positioned with respect to each other on opposite sides of a vertical plane of symetry passing lengthwise down the middle of the lure 10.

A single trailer hook 20 is attached to shank 12 of fish lure 10. Trailer hook 20 includes a hook portion 22 and an elongated linear trailer hook shank 24 as best shown in FIG. 2. An open trailer hook eye 26 (FIG. 1) is located on the forward end of trailer hook shank 24 remote from hook portion 21. An approximately 90° bend is formed at the forward end of shank 24 to provide an offset shank portion 30 at the outer of which trailer hook eye 26 as provided. As a result of the foregoing construction, trailer hook eye 26 lies in a plane normal to trailer hook shank portion 24.

Trailer hook 20 can be attached to double hook lure 10 by placing trailer hook eye 26 around double hook shank 12 and closing eye 26 around shank 12 with a pair of pliers or the like to achieve a loose fit permitting movement of hook eye 26 along the length of shank 12 of the double hook as seen best in FIG. 1. Likewise, trailer hook 20 can be removed by manually opening trailer hook eye 26 back up.

The trailer hook 20 is mounted on double hook shank 12, so as to be slidable along double hook shank 12 between double hook eye 16 and diverging barbed hook portions 14. A "hula" skirt 32 having a waist band 34 comprising for example an elastic rubber surgical band, and having rubber or plastic flutter ribbons or strips 36 extending therefrom, is slipped over double hook eye 16 and fits snugly around double hook shank 12 between double hook eye 16 and trailer hook eye 26 for use with the adjustable trailer hook. Skirt 32 can be moved along shank 12 toward diverging barbed portions 14 to force trailer hook eye 26 against the diverging barbed portions 14 and to position and hold trailer hook 20 in an extended position essentially fixed orientation wherein trailer hook shank portion 24a lies substantially parallel to double hook shank 12 as seen in FIG. 3; consequently, with the trailer hook barb 23 is positioned outwardly the maximum distance possible from shank 12 during motion of the lure through the water from right to left in FIG. 3. Thus, barb 23 is unobstructed by the double hook and is positioned in the optimum position for hooking a striking fish. Trailer hook 20 could be used in the FIG. 3 orientation when the lure is being used as an underwater lure in areas of low vegetation, where there is little risk of getting the trailer hook caught on weeds or other vegetation. Alternatively, if the lure shown in FIG. 3 is used as a topwater lure, barb 23 will ride above the surface of the water so as to avoid snagging subsurface hazards.

For lure use in high vegetation areas, skirt 32 would be moved forwardly toward double hook eye 16. As a result, trailer hook 20, no longer forced against the diverging barbed hook portions 14 and eye 26 loosely floats on shank 12 so that hook 20 assumes the retracted orientation shown in FIGS. 1 & 2. In this position shank 24 or hook 20 is out of parallel alignment with shank 12 barb 23 being shielded by the shank 24 so that the barb 23 of the trailer hook 20 is less likely to get caught on weeds as the lure 10 is moved through the water. The trailer hook 20 can be made ever more weedless by putting a plastic worm or grub (not shown) on barb 23 when in the FIG. 3 orientation for use of the lure in areas of high vegetation such as underwater moss.

From the above, it is apparent that many modifications and variations of the present invention are possible in light of the above teachings. It is therefore to be understood that, within the scope of the appended claims, the invention may be practiced otherwise than as specifically described.

What is claimed is:

1. A fish lure comprising:
   a double hook having a forward end defined by a double hook eye, a double hook shank portion having a lengthwise extending axis extending rearwardly from said double hook eye and a rearward end defined by two diverging barbed hook portions;
   a trailer hook having a barbed trailer hook portion defining its rearward extent and including a forwardly facing trailer hook barb, a trailer hook shank portion extending forwardly from said barbed trailer hook portion and having a forward end substantially perpendicular to said trailer shank portion proximate the forward end of said trailer hook shank portion remote from said barbed trailer hook portion, and
   a trailer hook eye extending from the forward end of the trailer hook shank portion and disposed in a plane having a transverse component normal to said trailer hook shank portion with said trailer hook eye loosely surrounding said double hook shank portion for sliding motion along said double hook shank portion between an extended position engaging and reacting with said diverging barbed portions of the double hook in which said trailer hook shank portion is substantially parallel to said double hook shank portion and said trailer hook barb is spaced a maximum distance outwardly from the axis of said double hook shank to enhance the chances of hooking a striking fish and a retracted position in which the trailer hook eye is moveable forwardly from said diverging barbed members to permit said trailer hook to move to a retracted position in which the trailer hook shank portion is canted relative to said double hook shank means with the trailer hook barb being spaced a minimum distance from the axis of the double hook shank means so that it is somewhat shielded in place thereof to reduce the possibility of the trailer hook barb snagging weeds or other hazards during forward movement of the lure through a body of water.

2. A fish lure as recited in claim 1 additionally including fixing means to hold said trailer hook eye against said diverging barbed portions to maintain said trailer hook assembly in said extended position.

3. The fish lure of claim 2, wherein said fixing means includes an elastic band which fits snugly around said double hook shank portion between said double hook eye and said trailer hook eye and is manually positionable at a desired position along the length of said double hook shank portion to effect adjustment of the position of said trailer hook eye so as to consequently adjust the extent to which said trailer hook can move toward said retracted position.

4. The adjustable trailer hook assembly of claim 3, wherein said trailer hook additionally includes an offset shank portion having an axial component perpendicular to the trailer hook shank portion connecting the trailer hook eye to the forward end of said trailer hook shank.

5. A fish lure having a forward end and a rearward end and including a double hook having a double hook shank portion with a double hook eye at a forward end and two diverging barbed portions at its rearward end and a trailer hook adjustably mounted on to said double hook shank for selective positioning along the length of said double hook shank.

6. The combination of claim 5, wherein said trailer hook comprises:
   a hook portion having a trailer hook barb,
   a trailer hook shank having a first shank portion extending from said trailer hook portion and an offset shank portion extending substantially perpendicularly from said trailer hook shank portion proximate an end of said trailer hook shank portion remote from said trailer hook portion, and
   a trailer hook eye extending from said offset
   a trailer hook eye extending from said offset shank portion and disposed in a plane substantially normal to said first shank portion,
said trailer hook eye loosely surrounding said double hook shank so as to be capable of sliding motion along said double hook shank between a first position engaging said diverging barbed portions and a second position away from said diverging barbed portions to adjust said trailer hook between a first orientation in which said trailer hook shank portion is substantially parallel to said double hook shank portion and the trailer hook barb is substantially unobstructed by said double hook and a second orientation in which said first shank portion lies at an angle relative to said double hook shank.

7. The combination of claim 6, further comprising holding means for holding said trailer hook shank against said diverging barbed portions to maintain said trailer hook in said first orientation.

8. The combination of claim 7, wherein said holding means comprises an elastic flexible skirt which fits snugly around said double hook shank rearwardly of said double hook eye and said trailer hook eye and is movable along the length thereof to effect different positions of adjustment of said trailer hook relative to said double hook.

9. The combination of claim 8 wherein and elastic flexible skirt includes a plurality of flutter ribbons trailing rearwardly over said double hook during movement of said lure through the water.

10. The adjustable trailer hook assembly of claim 5 wherein said trailer hook additionally includes an offset shank portion having an axial component substantially perpendicular to the trailer hook shank portion trailer hook eye provided on an outer end of said offset shank portion and fitted for movement on and along said double hook shank.

11. A trailer hook comprising:
   a barbed trailer hook portion defining the rearward extent of said trailer hook and including a forwardly facing trailer hook barb,
   a trailer hook shank portion extending forwardly from said barbed trailer hook and having a forward end substantially perpendicular to said trailer hook shank portion proximate the forward end of said trailer hook shank portion remote from said barbed trailer hook portion, and
   a trailer hook eye extending from the forward end of the trailer hook shank portion and disposed in a plane having a transverse component normal to said trailer hook shank portion.

12. The trailer hook of claim 11, further comprising:
   means for removably attaching said trailer hook to a fish lure in a manner such that said trailer hook is adjustable between a plurality of orientations relative to said fish lure.

13. The trailer hook of claim 12, further comprising:
   means for fixing said trailer hook in one of said orientations relative to said fish lure.

* * * * *